United States Patent [19]
Tremaine et al.

[11] Patent Number: 5,789,828
[45] Date of Patent: Aug. 4, 1998

[54] LOW VOLTAGE POWER SUPPLY AND DISTRIBUTION CENTER

[76] Inventors: Susan C. Tremaine; John M. Tremaine, both of 127 Lambert Rd., New Canaan, Conn. 06840

[21] Appl. No.: 780,049

[22] Filed: Dec. 24, 1996

[51] Int. Cl.⁶ .................... H02J 7/00; H02B 1/00
[52] U.S. Cl. .......... 307/64; 307/150; 361/622; 361/623; 361/610; 361/641; 361/601; 361/836
[58] Field of Search ................... 361/622, 623, 361/624, 625, 626, 610, 690, 641, 642, 835, 836, 600, 601, 602, 603; 307/64, 66, 150

[56] References Cited

U.S. PATENT DOCUMENTS

| | | | |
|---|---|---|---|
| 2,636,929 | 4/1953 | Southwick | 175/298 |
| 2,675,526 | 4/1954 | Friberg | 336/90 |
| 2,747,731 | 5/1956 | Bonanno | 206/46 |
| 2,778,001 | 1/1957 | Girton | 339/147 |
| 2,857,449 | 10/1958 | Akins | 174/16 |
| 2,958,056 | 10/1960 | DiGiovanni | 336/30 |
| 3,098,990 | 7/1963 | Farrand et al. | 336/172 |
| 3,621,339 | 11/1971 | Hodgson | 371/103 |
| 3,987,387 | 10/1976 | Gruber | 336/67 |
| 4,249,227 | 2/1981 | Kato et al. | 361/622 |
| 4,332,002 | 5/1982 | Yamaguchi | 361/432 |
| 4,334,171 | 6/1982 | Parman et al. | 315/199 |
| 4,408,154 | 10/1983 | Cote | 323/340 |
| 4,533,786 | 8/1985 | Borgmeyer et al. | 174/50 |
| 4,821,143 | 4/1989 | Holmgren | 361/724 |
| 4,956,745 | 9/1990 | Burgher et al. | 361/836 |
| 5,047,696 | 9/1991 | Nilssen | 315/312 |
| 5,111,114 | 5/1992 | Wang | 315/225 |
| 5,168,422 | 12/1992 | Duncan | 361/377 |
| 5,177,325 | 1/1993 | Giammanco | 174/50 |
| 5,189,257 | 2/1993 | Borgmeyer et al. | 174/50 |
| 5,243,493 | 9/1993 | Jeng et al. | 361/690 |
| 5,249,107 | 9/1993 | Poulsen | 362/249 |
| 5,307,254 | 4/1994 | Russell et al. | 362/368 |
| 5,352,958 | 10/1994 | Cunningham et al. | 315/291 |
| 5,365,145 | 11/1994 | Fields | 315/86 |
| 5,510,948 | 4/1996 | Tremaine et al. | 361/90 |

*Primary Examiner*—William M. Shoop, Jr.
*Assistant Examiner*—Jonathan Kaplan
*Attorney, Agent, or Firm*—Milton Oliver; Ware, Fressola, Van Der Sluys & Adolphson LLP

[57] ABSTRACT

A low voltage power supply and distribution center comprises a housing and a housing door. The housing door is removably mounted to the housing and may be repositioned between a service position and a closed position. In the service or open position, the housing door is hingely mounted to the housing and provides easy access to circuit components. All of the circuit components of the low voltage power supply and distribution center are directly mounted to the housing door, and access to many of the circuit components, such as switches, fuses and circuit breakers, may be provided directly through the housing door. The housing door is manufactured of a material that efficiently dissipates heat through radiation such that it acts as a heat sink for the circuit components mounted thereon. Vents having adjustable dampers are formed in the housing door and the position of the dampers may be adjusted to meet code requirements associated with a specific installation. The housing door provides sufficient heat dissipation such that when the housing is surrounded with 20 centimeters (8 inches) of insulation, the maximum surface temperature of the housing and housing door is less than 90° C. An emergency lighting circuit is provided to power the circuit components upon failure of the primary source of power.

53 Claims, 9 Drawing Sheets

LOW VOLTAGE POWER SUPPLY AND DISTRIBUTION CENTER

TECHNICAL FIELD

The present invention relates to a low voltage power supply, and more particularly, to a low voltage power supply and distribution center, for either surface or recess mounting in a wall or ceiling, which provides a safe and reliable supply of power to at least one low voltage load.

BACKGROUND OF THE INVENTION

It is well known to use low voltage lighting e.g., 12/24 volt halogen lighting, for interior lighting. It has been found that such low voltage lighting greatly reduces power consumption as compared with known high voltage lighting e.g., standard 120 volt light bulbs. Additionally, such low voltage lighting has a long service life and produces light of a quality which is highly desirable for residential, commercial, landscape and contract interior lighting.

In typical low voltage lighting applications, high voltage power, e.g., 120 volt, is supplied directly to a low voltage lighting fixture, and the fixture includes a transformer to step down the power to the required low voltage level. A problem associated with such a fixture is that building codes typically require that access be provided so that the transformer can be replaced. Therefore, an access hole is required to be at least large enough to receive a human hand. A typical code requirement is that an access hole be provided having a minimum diameter of 10 centimeters (4 inches) for accessing the transformer. However, the diameter of a typical low voltage lighting light bulb is between 3.5 and 5 centimeters (1.375 and 2 inches) having a european type ("euro" style) trim or reflector assembly of a diameter between 5 and 7.5 centimeters (2 and 3 inches). The light bulb and trim or reflector assembly diameter is much smaller than the required 10 centimeter (4 inch) diameter access required by code, and therefore, a large trim or reflector is used. Alternatively, when a "euro" style trim is used, an additional trim ring or other decorative device is provided to reduce the size of the access hole to the size of the light bulb and trim or reflector assembly. The market objects to these solutions, as what is desired is a refined look, similar to the "euro" style, utilizing the smallest trim or reflector possible without the requirement of an additional trim ring.

Another problem associated with known low voltage lighting fixtures having transformers mounted therein is that there may be a harmonic noise or hum made by the transformer at the frequency of the supply voltage. As is known in the art, such noise or hum may even be worse when the supply voltage is provided to the transformer via a dimmer. A dimmer is used to reduce the magnitude of the supply voltage, and therefore, the light intensity. If a large number of low voltage lighting fixtures are used in a lighting installation to light a large area, e.g., a large room such as a restaurant dining room, all of the transformers used for each of the lighting fixtures can create an undesirable background noise, which can be appreciatively louder when a dimmer is used.

It is known in the art that light dimming devices are not 100% efficient. Therefore, even when a dimmer is in a full bright (maximum light intensity) position, power loses occur in the dimmer such that the full line voltage is not provided to the transformer. For example, if the dimmer is only 90% efficient, the output voltage of the transformer will drop by approximately 10%. For a 12 volt AC rated secondary, the output voltage is only 10.8 volts AC. Therefore, lighting devices connected to the output of such a transformer do not operate at their maxim intensity when a full bright position of the dimmer is selected. For example, lamp manufacturers indicate that 12 volt lamps operating at 11 volts only produce approximately 74% of their normal light output (illumination). This output drops to approximately 50% at 10 volts.

In order to overcome the above-described drawbacks associated with co-locating a transformer with a low voltage load such as a low voltage light bulb, commonly owned U.S. Pat. No. 5,510,948, issued on Apr. 23, 1996, the disclosure of which is incorporated herein by reference, discloses a low volt power supply and distribution center. Such a low voltage power supply and distribution center is configured for connection between a high voltage supply line and at least one low voltage distribution line, with each low voltage distribution line being electrically connected to at least one voltage load which is located remotely from the low voltage power supply and distribution center. Therefore, with the low voltage power being supplied from a location remote from the low voltage load, the problems associated with locating a transformer directly with a low voltage load are avoided.

While the low voltage power supply and distribution center described in U.S. Pat. No. 5,510,948 provides a significant improvement over prior art methods of powering low voltage loads, still further improvements in the design of a low voltage power supply and distribution center may be achieved, particularly with respect to accessibility, heat dissipation and mounting of the low voltage power supply and distribution center and various circuit components associated therewith.

SUMMARY OF THE INVENTION

An object of the present invention is to provide an improved low voltage power supply and distribution center which may be mounted in a return air plenum or in or on a wall or ceiling for supplying voltage to at least one low voltage load mounted remotely from the low voltage power supply and distribution center, the low voltage power supply and distribution center having a housing door and housing, the housing door providing improved accessibility to the various components of the low voltage power supply and distribution center.

Another object of the present invention is to provide such a low voltage power supply and distribution center wherein the housing door includes the circuit components of the low voltage power supply and distribution center mounted thereon such that the housing door acts as a heat sink for the efficient dissipation, through radiation, of heat generated by the circuit components mounted thereon.

A further object of the present invention is to provide such a low voltage power supply and distribution center with vents having adjustable dampers capable of multiple positioning to meet various code requirements. When the low voltage power supply and distribution center is mounted in or on a wall or ceiling, the dampers are adjusted to open the vents for heat dissipation through convective heat loss. When the low voltage power supply is positioned within a return air plenum, the dampers are positioned to close the vents in accordance with code requirements.

A further object of the present invention is to provide such a low voltage power supply and distribution center which includes a dimmer assembly for simultaneously and independently dimming a plurality of loads.

A still further object of the present invention is to provide such a low voltage power supply and distribution center which includes emergency power supply and control circuitry for supplying power to at least one emergency lighting fixture for emergency lighting in response to a loss of a primary source of power.

Another object of the invention is to provide such a low voltage power supply and distribution center with a housing door having a removable area or section such that a dimmer, controlled switching device, or other switching device may be mounted directly thereto to provide access to such device without repositioning the housing door.

According to the present invention, a low voltage power supply and distribution center comprises a housing and a housing door. The housing door is removably mounted to the housing such that it may be easily repositioned between a service position and a closed operating position. In the closed operating position the housing door may be permanently mounted to the housing. In the service or open position, the housing door is hingely mounted to the housing and provides easy access to circuit components of a low voltage power supply and distribution center. All of the components of the low voltage power supply and distribution center are directly mounted to the housing door, and access to many of the circuit components, such as switches, fuses and circuit breakers, may be provided directly through the housing door. The housing door is manufactured of a material that efficiently dissipates heat through radiation such that it acts as a heat sink for the circuit components mounted thereon. Vents having adjustable dampers are formed in the housing door and the position of the dampers may be adjusted to meet code requirements associated with the specific installation of the low voltage power supply and distribution center. The damper may be mounted on the housing door or to the housing, as desired.

According further to the present invention, the low voltage power supply and distribution center may be surface mounted within a return air plenum, surface mounted on a wall or ceiling, or recess mounted within a wall or ceiling. When the low voltage power supply and distribution center is recess mounted, the improved housing door provides sufficient heat dissipation such that when the housing is surrounded with 20 centimeters (8 inches) of insulation, the maximum surface temperature of the housing and housing door is less than 90° C. to thereby meet Underwriters Laboratory requirements for being classified as inherently protected.

According still further to the present invention, if the surface temperature of the housing door exceeds 90° C. for a particular installation, a protective cover may be provided such that the surface temperature of the cover is less than 90° C.

In further accord with the present invention, the circuit components mounted on the housing door include at least one toroidal transformer for transforming power from a primary source of power into low voltage power which may be distributed from the low voltage power supply and distribution center.

In still further accord with the present invention, mounted on the housing door is a high voltage compartment for the high voltage connection between the primary source of power and the transformer. Additionally, mounted within the housing or on the housing door, the high voltage compartment may comprise switching means such as a switch or dimmer for switching and dimming the source of high voltage power. The switch or dimmer may be manually operated, or remotely operated for example by radio control, infrared control, or digital control through supply current.

According further to the present invention, a plurality of toroidal transformers may be mounted on the housing door, each corresponding to a separate low voltage circuit. The plurality of transformers may be switched or dimmed together, or individually switched or dimmed. When the plurality of transformers are individually switched, a single dimmer unit may be used which is capable of simultaneously and independently dimming the high voltage power supplied to each one of the plurality of transformers.

According still further to the present invention, the low voltage power supply and distribution center includes circuit means for detecting the line voltage of the high voltage power supply, the circuit means including a backup power supply, such as a long life, rechargeable, DC battery, which is capable of powering at least one low voltage load, the circuit means supplying power to the at least one low voltage load from the back-up power supply when it detects that the line voltage of the high voltage power supply falls below a predetermined voltage level.

The low voltage power supply and distribution center of the invention, including an improved housing door, provides a significant improvement over the prior art. The housing door includes all of the circuit components of the low voltage power supply and distribution center mounted directly thereon. The vents and adjustable dampers formed in the housing door provide the significant advantage of adapting the low voltage power supply and distribution center for various code requirements. For example, for surface or recess mounting of the low voltage power supply and distribution center in or on a wall or ceiling, the dampers are positioned such that the vents remain open to provide extra ventilation for the components inside the low voltage power supply and distribution center for heat removal through convective heat loss. However, when the low voltage power supply and distribution center is mounted within a return air plenum, the ventilation holes are completely covered by the dampers in a sufficient manner to meet the code requirements, such as those of the city of Chicago, Ill., USA.

The ease of assembly, position adjustment, and removal of the housing door provides a significant advantage in the field when installing and maintaining the low voltage power supply and distribution center. Because the housing door provides access to various circuit components such as circuit breakers, on/off switches and/or dimmer switches, improved utility, accessibility and ease of function is obtained with the improved design of the invention. By providing the housing door as a solid unit and formed of a material which attracts and dissipates heat, such as diecast aluminum, the heat generated by the circuit components mounted on the housing door is easily and efficiently dissipated by the housing door. This provides a significant advantage as compared to the prior art.

A further significant advantage of the invention is that the low voltage power supply and distribution center may be used as part of an emergency lighting system. A monitoring circuit is provided in the system to monitor the line voltage of the high voltage power supply. If a loss of power is detected, the monitoring circuit automatically switches one or more of the low voltage loads over to an emergency source of power, such as battery power. Therefore, the system of the invention may be used to meet both normal lighting requirements and emergency lighting requirements.

The foregoing and other objects, features and advantages of the present invention will become more apparent in light of the following detailed description of exemplary embodiments thereof, in view of the accompanying drawings.

BEST MODE FOR CARRYING OUT THE INVENTION

The low voltage power supply and distribution center of the present invention includes a housing door mounted to a housing wherein the circuit components of the low voltage power supply and distribution center are mounted directly on the housing door. The housing door is easily repositionable and also may be permanently secured to the housing. The improved housing door provides easy access to the circuit components and to the housing during installation and maintenance of the low voltage power supply and distribution center. The housing door may be manufactured of a material so that it act as a heat sink for the circuit components, and heat generated by the circuit components is dissipated by the housing door through radiation.

Figure 1:
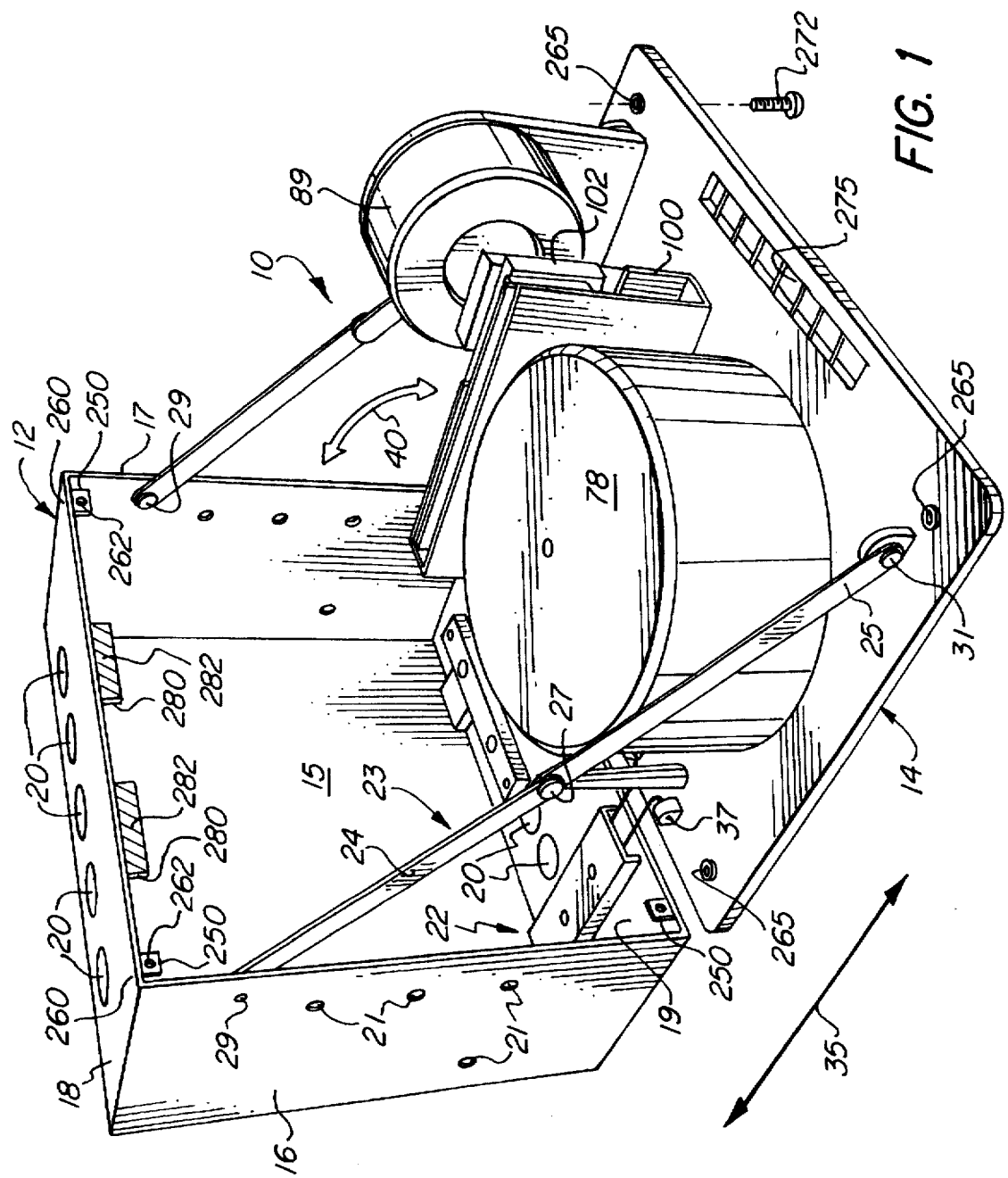
FIG. 1 is a perspective view of a low voltage power supply and distribution center in accordance with the invention with a housing door of the center being open.

Referring to FIG. 1, the low voltage power supply distribution center 10 includes a housing 12 and a housing door 14. The housing includes a rear wall 15 left and right side walls 16, 17, a top wall 18 and bottom wall 19. The side, top and bottom walls 16, 17, 18, 19 extend perpendicular from the rear wall 15 to thereby form a compartment therein. Various knockouts 20 and screw mounting apertures 21 may be formed in the housing 12 for wiring entry into the housing and for mounting various components to the housing 12.

As is known in the art, the housing 12 may be formed of various sheets of metal welded together, or alternatively, the housing may be formed from a single metal sheet which is cut, bent and welded to thereby form the housing including the housing compartment as illustrated in FIG. 1. Alternatively, the housing may be formed by injection molding of a plastic or other suitable material or die cast of a suitable metal.

The housing door 14 is mounted to the housing 12 by a spring hinge assembly 22 and a hinge arm assembly 23. The hinge arm assembly 23 includes a pair of hinge arms 24, 25 which are connected to each other at a pivot location 27. One of the hinge arms 24 is pivotally mounted to the housing 12 by a pivot pin 29 and the other pivot arm 25 is pivotally mounted to the housing door 14 by a snap pivot 31. Each of the pivot points 27, 29 and 31 may include a rivet, bolt assembly, rivet assembly, snap pivot assembly, or other means for allowing pivotal movement of the hinge arms 24, 25 about the pivot locations 27, 29 and 31. The snap pivot 31 is of the well-known metal snap fastener construction, such as is often used for example to fasten the waist of pants, and provides the ability to "unsnap" to thereby make the housing door removable.

Figure 2:
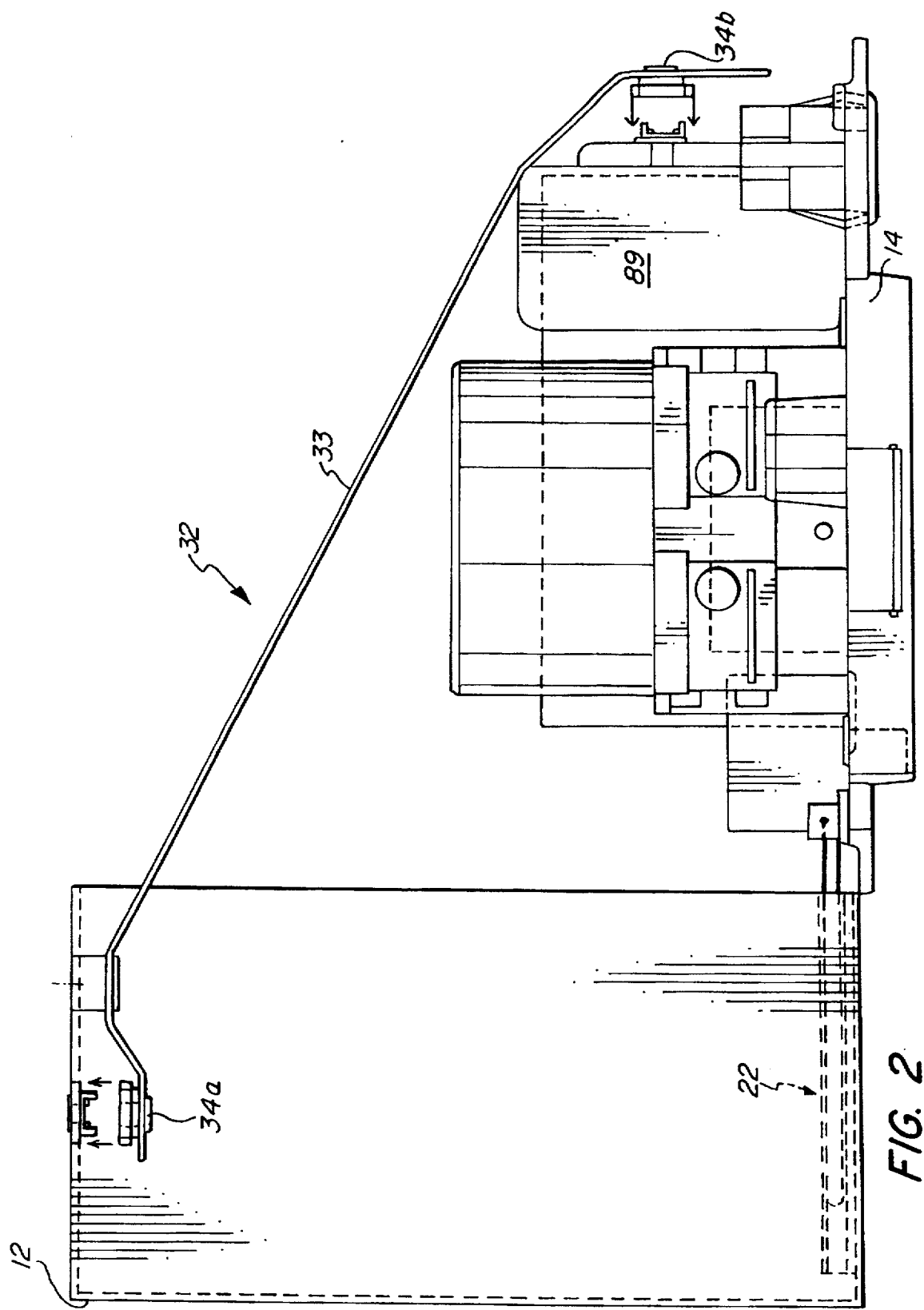
FIG. 2 is a side view of a second embodiment of the low voltage power supply and distribution center of FIG. 1, with the housing door shown open.

Referring to FIG. 2, in a second embodiment of the invention, rather than providing hinge arm assemblies 23, the housing may be provided with a high strength strap assembly 32 for securing the housing door 14 to the housing 12. The strap assembly 32 includes a strap 33 made of a high strength, flexible material, such as a nylon web belt, having sufficient strength to support the housing door 14. The strap 33 is mounted on one end to the housing 12 by suitable permanent or temporary fastening means 34a, such as a screw or snap fastener. The other end of the strap 33 may be mounted to a suitable location on the power door, or to a circuit component mounted on the power door, by suitable permanent or temporary fastening means 34b, such as a screw or snap fastener.

Referring also to FIG. 1, the spring hinge assembly 22 allows the housing door 14 to move with respect to the housing 12 in two ways. First, the spring hinge assembly 22 allows the housing door 14 to move in and out with respect to the housing 12 as illustrated by the arrow 35. Additionally, the spring hinge assembly 22 allows the housing door 14 to pivot about a pivot axis 37 in the direction illustrated by the arrow 40.

Figure 3:
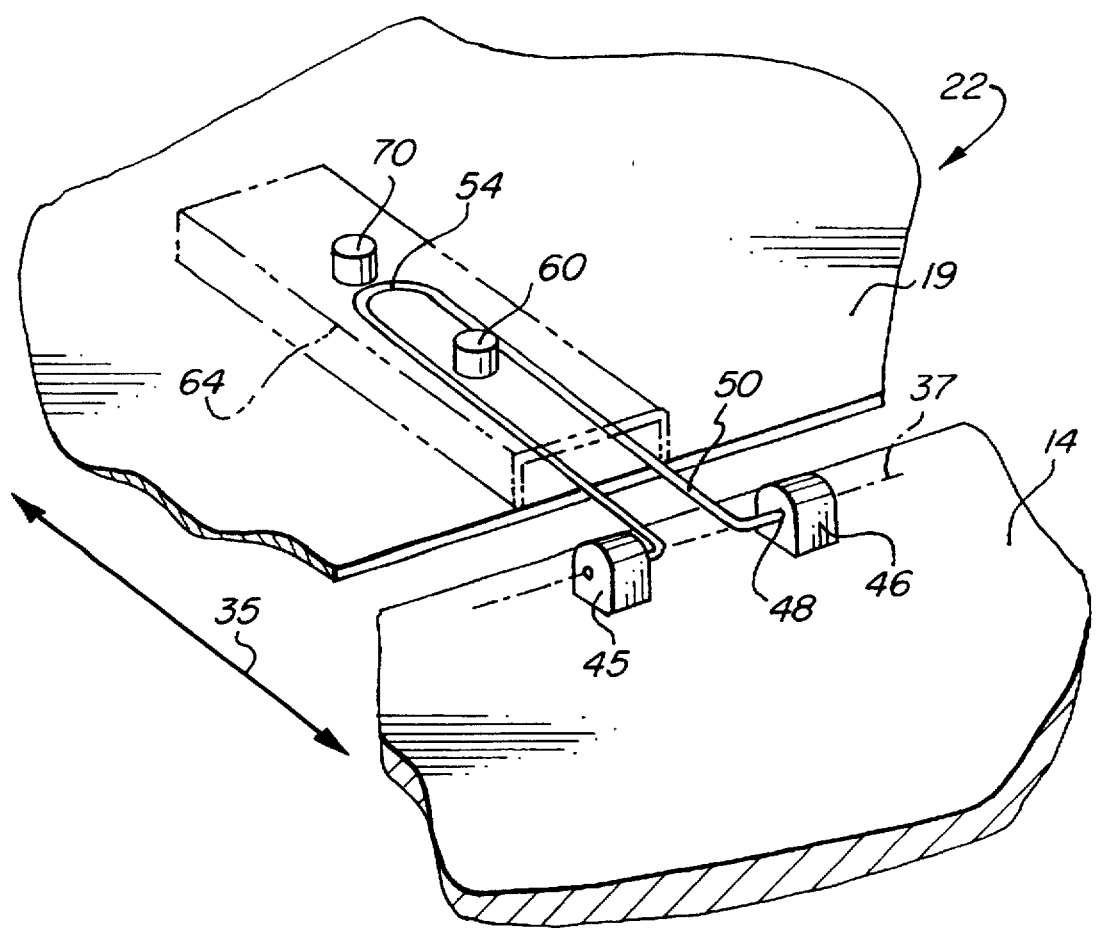
FIG. 3 is a perspective view of a spring hinge assembly used to mount the housing door of FIG. 1 mounted to a low voltage power supply and distribution center housing.

Referring to FIG. 3, the spring hinge assembly 22 is shown in greater detail. The housing door includes a pair of mounting brackets 45, 46 which may be mounted to, or integrally formed in, the housing door 14. Apertures 48 are formed in the mounting brackets 45, 46 for receiving the ends of a spring hinge 50. The spring hinge 50 is a generally U shaped member which flexes about a flex point 54 with the ends of the spring member 50 projecting generally outward from the spring arms to be received in the apertures 48 formed in the mounting brackets 45, 46. A rivet, bolt, or other fastening means 60 is mounted on the bottom wall 19 of the housing 12 to limits the distance along the line 35 which the door 14 may be moved in and out with respect to the housing 12. Received over the spring 50 and the fastening means 60 is a housing cover 64 (shown in phantom) which maintains the spring 50 on the fastening means 60 and which limits the side-to-side movement of the spring 50. The cover 64 is secured to the bottom housing wall 19 by the fastener 60 and a second fastener 70. Therefore, the fasteners 70 and 60 cooperate to hold the cover to the bottom housing wall 19. The housing door 14 pivots with respect to the housing 12 about the ends of the spring hinge 50 (at pivot axis 37) which are received in the aperture 48 of the brackets 45, 46. For easy removal of the housing door, the spring hinge is flexed (compressed) about the flex point 54 such that the ends of the spring hinge 50 may be removed from the apertures 48 of the brackets 45,46.

Returning to FIG. 1, the housing 12 may be mounted in or on a wall or ceiling in the same manner as the housing disclosed in U.S. Pat. No. 5,510,948, the disclosure of which is incorporated herein by reference, and in particular, the mounting of the housing as illustrated in FIGS. 8–16 and described in column 7, line 25 through column 9, line 27. Alternatively, the housing 12 may simply be permanently mounted within a wall or ceiling using permanent support brackets.

Figure 4:
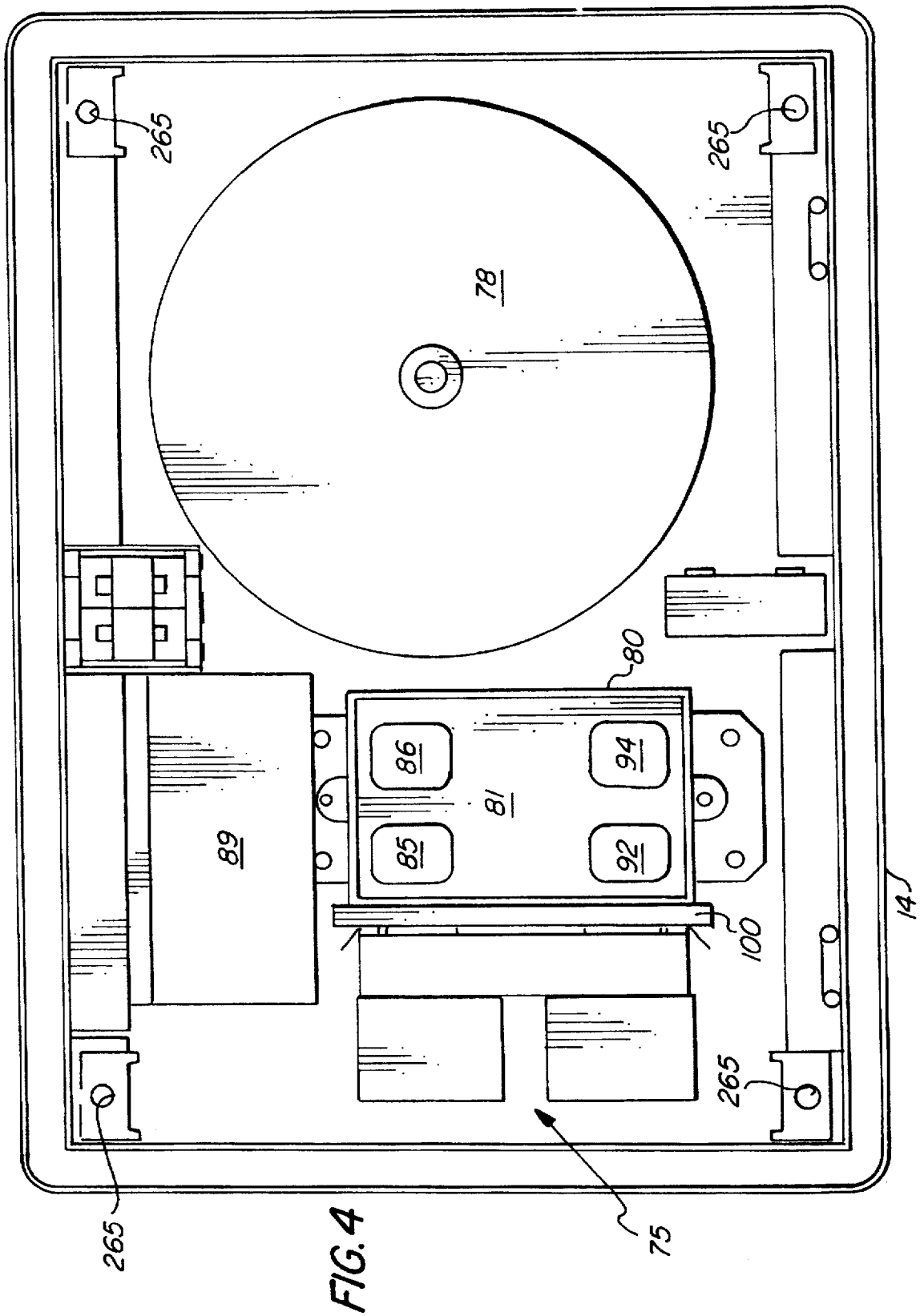
FIG. 4 is a perspective view of the housing door with the circuit components mounted thereon.

Referring now to FIG. 4, the housing door 14 is shown in greater detail. The housing door 14 provides a mounting surface for the circuit components 75 of the low voltage power supply and distribution center 10. As illustrated in FIGS. 1, 2 and 4, all of the circuit components 75 of the low voltage power supply and distribution center 10 are mounted directly on the housing door 14. The housing door 14 is manufactured of a material which is useful as a heat sink, such as diecast aluminum, to thereby dissipate the heat (through radiation) generated by the circuit components 75 mounted thereon.

The circuit components 75 include at least one transformer 78 which is mounted on the housing door 14 such that when the housing door 14 is directly mounted in full engagement with the housing 12, the transformer 78 is located within the housing 12. Also mounted to the housing door 14 is a switch box 80 forming a high voltage compartment 81 wherein the high voltage connections between the transformer 78 and incoming high voltage lines 82 are made. Additionally, located within the high voltage compartment 81 is a switch 85 between the high voltage lines 82 and the transformer 78 for turning on or off the power to the transformer 78. The switch 85 may include a simple on/off switch or alternatively, the switch 85 may include a dimmer which, as is known in the art, increases and reduces the voltage supplied to the transformer 78. The high voltage compartment 81 formed by the switch box mounted to the housing door 14 is designed such that when the housing door is mounted directly to the housing, the low voltage power supply and distribution center meets National Electric Code (NEC) Class 1 and Class 2 wiring requirements.

As discussed above, when the dimmer is in the full-bright or maximum illumination position, the output of the dimmer may be decreased by as much as 10% associated with losses and inefficiency in the dimmer. Therefore, for a low voltage power supply and distribution designed to provide 12 volts to remotely located loads, the actual output of the power supply is on the order of 10.8 volts. Therefore, even when the dimmer is in the full-bright or maximum illumination position, the lighting loads provided with power by the low voltage power supply and distribution center are not fully illuminated. Therefore, the transformer used in the low voltage power supply and distribution center is provided with several taps on the primary winding. Each tap provides a different ratio between the high voltage supply and the low voltage output of the transformer. The particular tap selected for use in a given transformer is determined based on the losses associated with the dimmer and other circuit components in the power supply and distribution center. Therefore, for example, if there are 15% losses associated with the dimmer and other associated circuitry, taps are selected on the transformer such that the output of the low voltage power supply and distribution center would be approximately 14.1 volts in the absence of any losses, and would be 12 volts in the presence of the 15% losses associated with the dimmer and other circuitry. This provides a significant improvement over the prior art because the low voltage power supply and distribution system of the invention provides the maximum rated line voltage to low voltage loads connected thereto.

Rather than using multiple taps to account for circuit losses as described above, in another embodiment of the invention a compensating circuit 86 may be provided. When a compensating circuit is provided, a single higher voltage output from the transformer is used. The compensating circuit utilizes feedback and feedforward to automatically compensate for losses caused by incoming power and output power. For example, the compensating circuit monitors the incoming voltage to the transformer, and adjusts the output power of the transformer to make up for voltage losses. Additionally, the compensating circuit monitors the transformer output, and makes adjustments accordingly to account for losses.

As described in commonly owned U.S. Pat. No. 5,510, 948, if a dimmer is used as the switch 85, a choke (inductor) 89 may be provided in line with the dimmer. The choke 89 smooths the output power provided by the dimmer to thereby minimize noise generated by the transformer 78 during operation. The choke 89 is mounted on the housing door 14 within the housing 12 or on the outside of the housing door. The dimmer may be manually operated, or alternatively, remotely operated for example by radio control, infrared control, or digital control through supply current.

If live conductor technology is used for the wiring installation, a circuit protection device 92 may be used on the primary to rapidly secure power to the transformer 78 when an increase in load is detected. The increase of load may be indicated by an increase in current. The purpose of the circuit protection device 92 is to safely control the high current (amperage) associated with open (uninsulated) low voltage circuits. This safety device 92 is used to obtain UL listing for live conductor lighting systems, such as a cable lighting system, by instantaneously shutting down the lighting system in the event of a short circuit or overload condition.

When live conductor protection is not required, a manual push-to-reset thermal circuit breaker 94 may be provided on the primary at the output of the choke 89, the output of the switch 85, or at any other suitable location in the circuit. The circuit breaker 94 is used to interrupt the power supply to the transformer in response to an over current condition sensed by this primary circuit breaker 94, thereby protecting the circuit.

Also mounted on the housing door is a fuse panel or circuit breaker panel 98 (secondary panel) for secondary circuit protection. The secondary panel 98 comprises a holder 100 for holding a plurality of fuses or circuit breaker 102. A separate 5 amp fuse or circuit breaker 102 is provided for each 12 volt or 24 volt low voltage load connected to the low voltage power supply and distribution center 10 for Class 2 wiring. For Class 1 wiring, multiple low voltage loads may be connected to each fuse or circuit breaker 102. In a Class 1 wiring configuration, the number of low voltage loads connected to a fuse or circuit breaker 102 will depend on the fuse or circuit breaker rating and the amperage of the loads. As will be understood by those skilled in the art, the number of fuses or circuit breakers required for a given installation will depend on the size of the various low voltage loads connected to the low voltage power supply and distribution center, and the total number of loads connected to the low voltage power supply and distribution center is dependent upon the power rating of the transformer. Additionally, by providing a plurality of fuses or circuit breakers 102 connected to the transformer in a plurality of circuits, the current supplied by the transformer is broken down into smaller, and therefore safer, current loads associated with each of the circuits.

As will be understood by those skilled in the art, the high voltage provided by the high voltage line to the transformer is transformed to a low voltage which is distributed to low voltage loads via fuses or circuit breakers. The fuses or circuit breakers provide additional protection against a short circuit or other dangerous condition which should happen on one of the low voltage lines from damaging the remainder of the circuit.

Referring to FIGS. 1, 3 and 4, the housing 12 and the housing door 14 are manufactured such that the housing door 14 may be permanently affixed to the housing 12. Brackets 250 are mounted at the four corners of the housing. The brackets 250 may be secured in place by rivets 260, or other fastening means, such as bolts, screws or spot welding. Alternatively, the brackets 250 may be formed in a single sheet of metal with the housing. As will be understood by those skilled in the art, if the housing is injection molded or die cast, the brackets may be formed directly in the housing. The bracket 250 are generally L-shaped and include a threaded aperture 262 formed therein for receiving a threaded fastener. Apertures 265 are formed in the four corners of the housing door 14 for receiving fasteners 272 therethrough for mating engagement with the threaded apertures 262 of the brackets 250 for fastening the housing door 14 to the housing 12. As will be understood by those skilled in the art, any suitable means of fastening the housing door 14 to the housing 12 may be used with the present invention.

For improved cooling and ventilation for circuit components mounted to the housing door 14, ventilation opening 275 are formed in the housing door 14. Also mounted to the housing door or housing are damper brackets 280 which may be repositioned to cover the ventilation openings 275. Gasketing materials 282 may be provided on the brackets 280 to securely seal the opening 225 when the brackets 280 are positioned to cover the openings 275. When the low voltage power supply and distribution center is mounted in or on a wall or ceiling, the damper brackets 280 are positioned to leave the ventilation openings 275 uncovered. As will be understood by those skilled in the art, there are various methods of covering the ventilation openings 275 in accordance with the present invention. For example, as described herein, sliding brackets or dampers 280, preferably covered with a gasketing material 282, may be used to open or close the openings 275 for ventilation as required. Alternatively, other devices may be used to cover the openings 275, such as snap fit covers, plugs, inserts, or any other suitable method of opening and closing the openings 275.

With the openings 275 in the housing door, cooling of the circuit components mounted to the housing door is achieved both through convective heat loss (by ventilation through the ventilation openings 275) and by radiation heat loss via the housing door itself. However, in order to meet the code requirements of installation of a device in a return air plenum, the ventilation openings 275 are completely covered by the damper brackets 280 when the low voltage power supply and distribution center is mounted within a return air plenum. Although there is less cooling of the circuit components through convective heat loss when the ventilation openings are covered by the damper brackets 280, the increased air flow within a return air plenum improves the efficiency of radiation heat loss via the housing door to thereby maintain the low voltage power supply and distribution center housing temperature within required specifications to meet code requirements.

As will be understood by those skilled in the art, if sufficient heat dissipation is achieved through radiant heat loss, the housing door may be provided without any vents or dampers. In one particular application of the invention, the heat dissipation through radiation and/or convective heat loss should be sufficient such that when the housing is surrounded with 20 centimeters (8 inches) of insulation, the maximum surface temperature of the housing and housing door is less than 90° C. to thereby meet Underwriters Laboratory requirements for being classified as inherently protected. If the surface temperature of the housing door exceeds 90° C., an optional cover 300 (shown in phantom in FIG. 5) may be provided such that the maximum surface temperature of the cover does not exceed 90° C.

Figure 5:
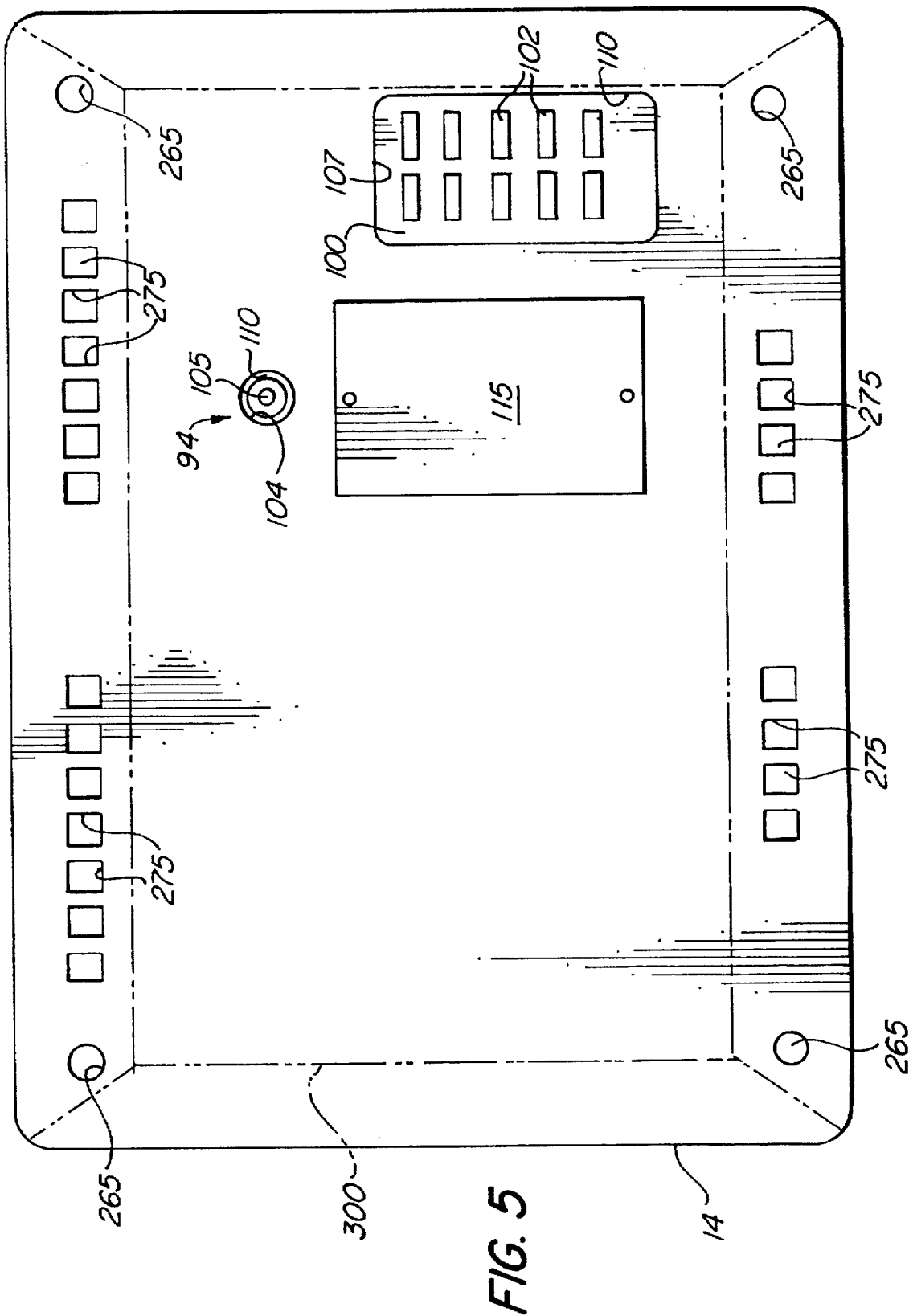
FIG. 5 is a front view of a second embodiment of the housing door of FIG. 1.

Referring to FIG. 5, the housing door of the invention provides several other possible improvements over the prior art. First, the manual push-to-reset thermal circuit breaker 94 located on the primary side (FIG. 4) and mounted directly on the housing door 14 may be accessed through the housing door 14. In order to provide access to the circuit breaker 94, an opening 104 is formed in the housing door for receiving the operative end 105 of the manual push-to-reset circuit breaker 94. After the circuit breaker 94 has been automatically activated in an emergency situation, once the condition which caused the overload to occur has been corrected, the circuit breaker 94 may be accessed directly on the housing door 14 for resetting the circuit without the requirement of opening the housing door 14 from the housing 12 (FIG. 1). Additionally, the fuses or circuit breakers 102 associated with each of the low voltage loads may be mounted on the secondary holder 100 through an opening 107 formed in the housing door 14 such that the fuses or circuit breakers 102 may be accessed without removal of the housing door 14 from the housing 12. In order to maintain the requirements of plenum rating for the low voltage power supply and distribution center, appropriate gasket material 110 is provided between the housing door 14 and the fuse holder 100 and between the housing door 14 and the circuit breaker 94 to thereby properly seal the low voltage power supply and distribution center 10 when the housing door 14 is installed on the housing 12. Additionally, such gasket material 110 is used at every other seam in the system, including between the housing 12 and the housing door 14. A removable panel 115 may be formed directly in the housing door 14 for providing access to the high voltage compartment 81 (FIG. 4). Therefore, a switching device, dimmer, circuit breaker or other circuit component mounted on the housing door 14 may extend through the housing door 14 and be accessed from the outside. A removable cover may be provided if the circuit breakers are mounted to extend through the housing door 14.

Figure 6:
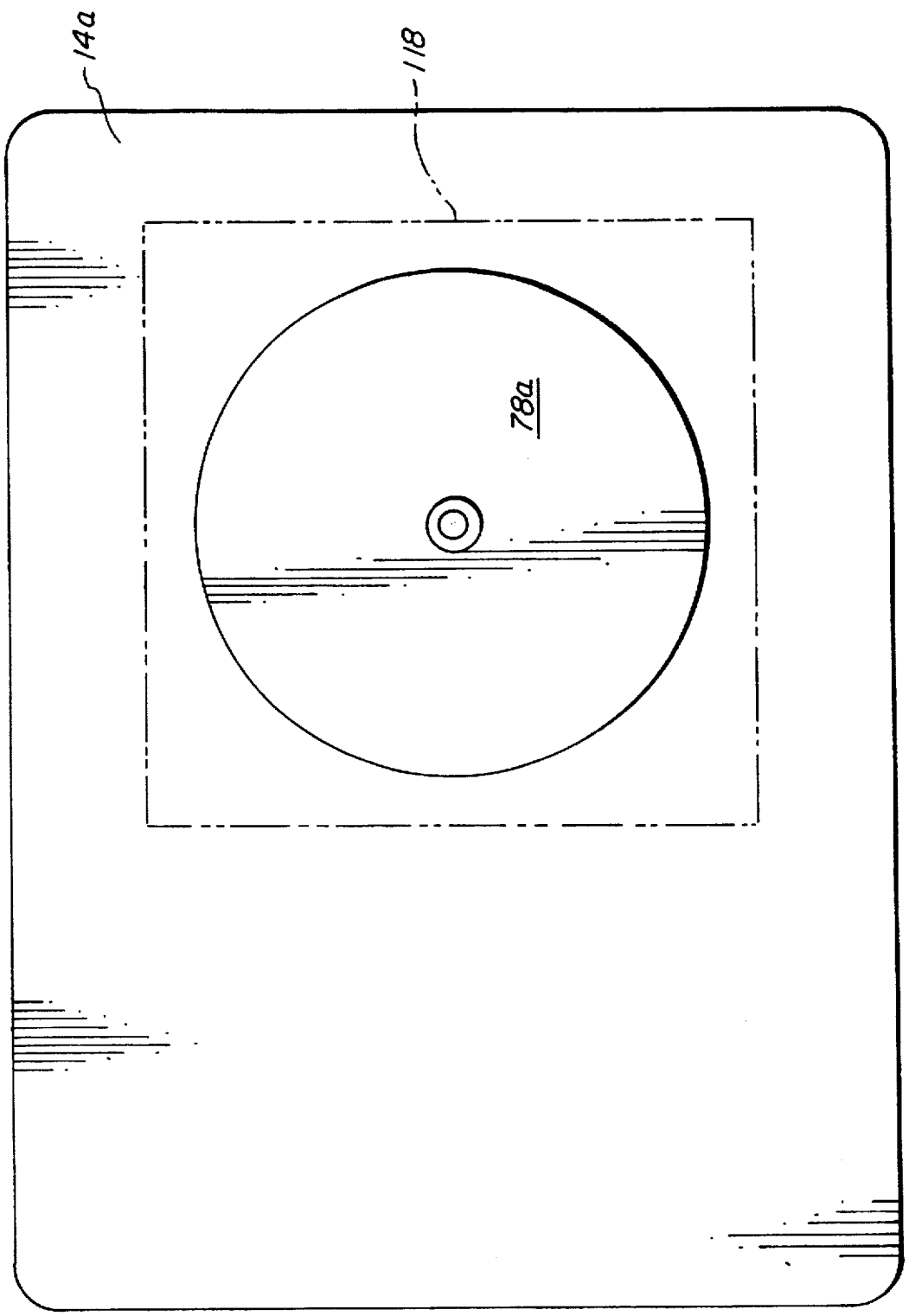
FIG. 6 is a front view of a third embodiment of the housing door of FIG. 1 having the transformer mounted on the outside of the low voltage power supply and distribution center.

Referring to FIG. 6, in another embodiment of the invention one or more transformers 78a and/or chokes may be mounted on the outside of the housing door 14a and may be provided with an additional cover 118, made of plastic or other suitable material, to provide a surface that does not exceed 90° C. and for access to the transformers 78a and/or chokes. If the transformer 78a and/or chokes are mounted on the outside of the housing door 14a, they may be suitably sealed, for example by a thick layer of epoxy coating, to thereby protect them against damage and also to increase heat dissipation during operation.

Figure 7:
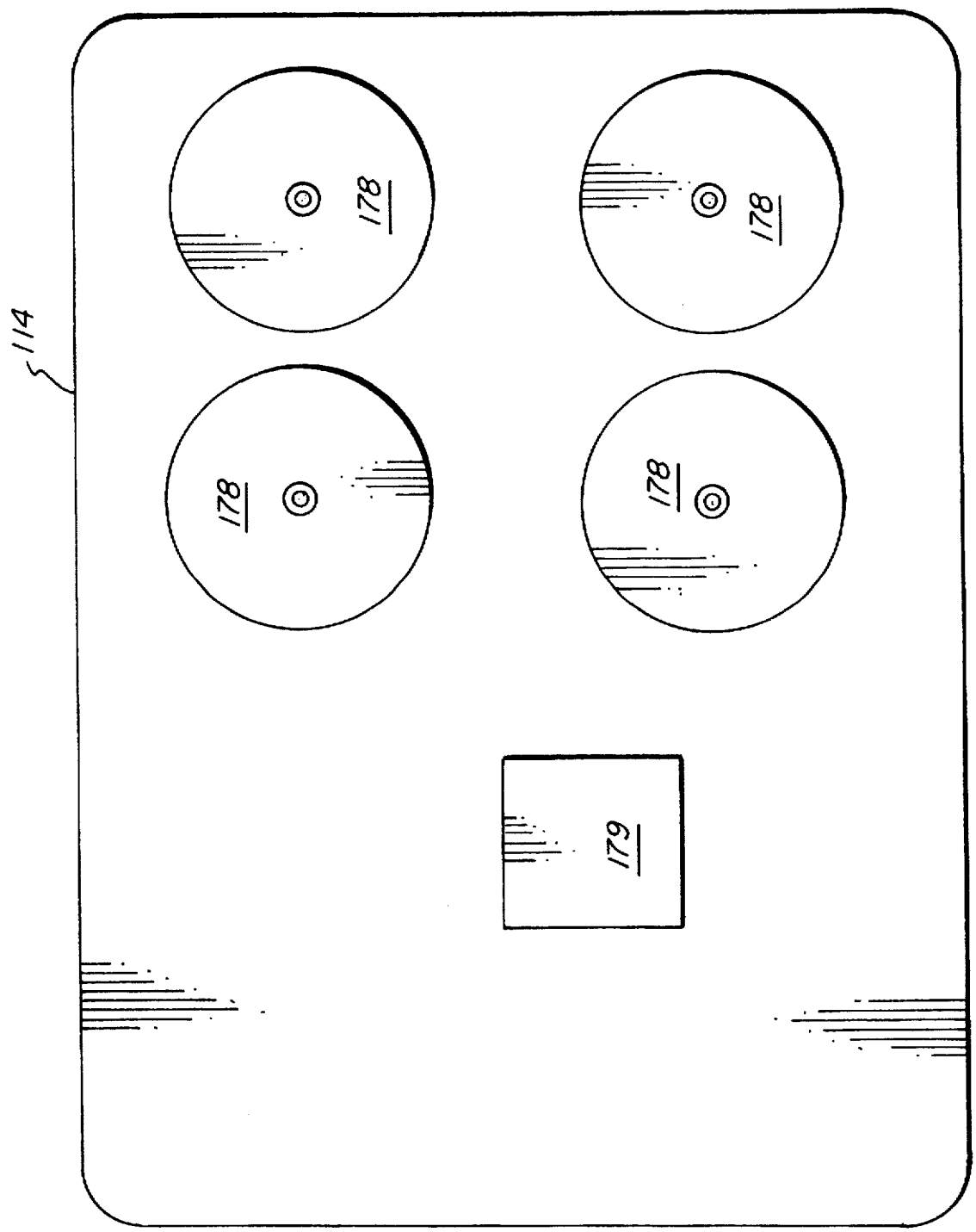
FIG. 7 is a front view of a fourth embodiment of the housing door of FIG. 1 having multiple transformers mounted thereon.

Referring to FIG. 7, in a further embodiment of the invention, a plurality of transformers 178 and/or chokes may be mounted on the housing door 114 (either internal or external to the housing) as opposed to mounting a single transformer on the housing door. Each of the transformers 178 and/or choke is associated with a low voltage circuit. When multiple transformers 178 and/or chokes are mounted on the housing door 114, a dimmer 179 which is capable of separately and independently dimming a plurality of loads may be provided for dimming the supply voltage supplied to each transformer. For example, a dimmer module capable of dimming a plurality of different loads, such as a 1.2 or 2.4 K w dimmer, may be used as a dimmer to independently and separately dim the high voltage power supplied to the different transformers 178. When multiple transformers and chokes, for example eight 150 watt transformers and associated chokes, are utilized in the low voltage power supply and distribution center of the invention, each transformer and choke combination may be used to power a separate lighting channel or circuit. In this situation, a single dimmer, such as a 1.2 Kw dimmer having 8 channels, may be used to independently control each channel. In this case the dimmer will have an internal or external processor for providing the desired control voltage to each channel. Such a dimmer may be provided directly in the low voltage power supply and distribution center or in a separate enclosure located remotely from the low voltage power supply and distribution center. Although the low voltage power supply and distribution center is described as utilizing a choke for each channel, if such dimmers are provided with a choke, an additional choke for each channel may not be required.

Figure 8:
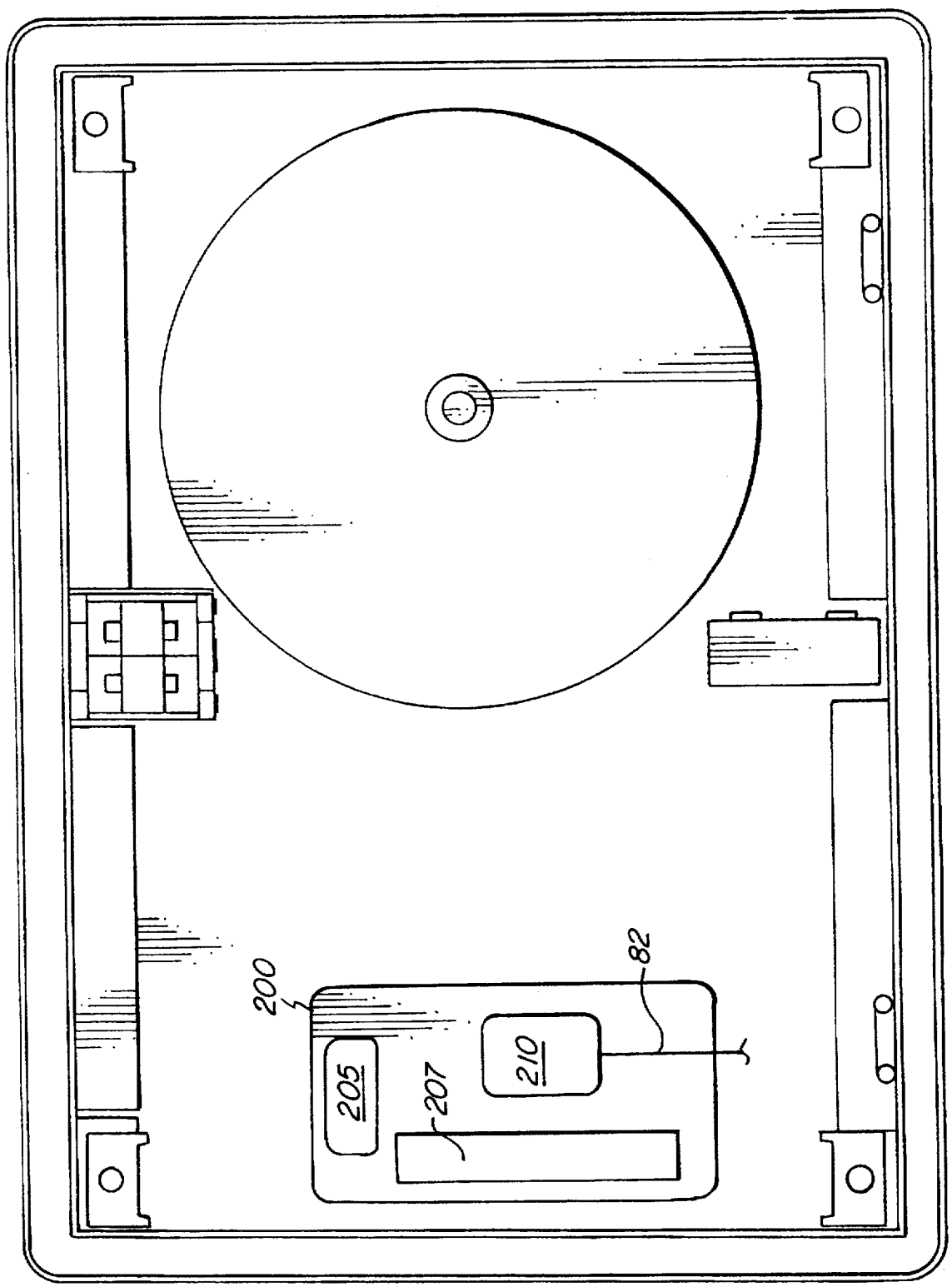
FIG. 8 is a front view of a fifth embodiment of the housing door of FIG. 1 having am emergency lighting circuit mounted thereon.

Referring to FIG. 8, an emergency lighting circuit 200 may be provided in the low voltage power supply and distribution center 10. The emergency lighting circuit 200 includes a voltage detecting circuit 205, an emergency power supply 207, such as a long life rechargeable battery, and a switching circuit 210. The voltage detecting circuit 205 continuously monitors the line voltage on the high voltage power supply lines 82. If the voltage detecting circuit 205 detects that the line voltage on the high voltage supply lines 82 has fallen below a predetermine value, it provides a signal to the switching circuit 210 to switch over from supplying voltage to selected low voltage loads from the output of the transformer 78 to the output of the emergency power supply 207. If the voltage detecting circuit 205 detects that the line voltage on the high voltage supply lines 82 has risen above a second predetermined voltage, it controls the switching circuit 210 to switch back such that all of the low voltage loads are supplied power from the transformer 78. In order to maintain the emergency power supply 207 ready for operating, a charging circuit may be provided to thereby continuously maintain the emergency power supply 207 in a charged condition.

The emergency lighting circuit 200 may be provided in the low voltage power supply and distribution center 10 as describe above. However, as will be understood by those skilled in the art, an emergency light circuit, or a portion thereof, may be located remotely form the low voltage power supply and distribution center 10. For example, a self contained emergency power supply, such as a battery or generator, may be located remotely from the low voltage power supply and distribution center 10. The switching means to switch over between normal and emergency operation may either be located in the low voltage power supply and distribution center 10 as described above, or remotely, for example with the power supply.

Figure 9:
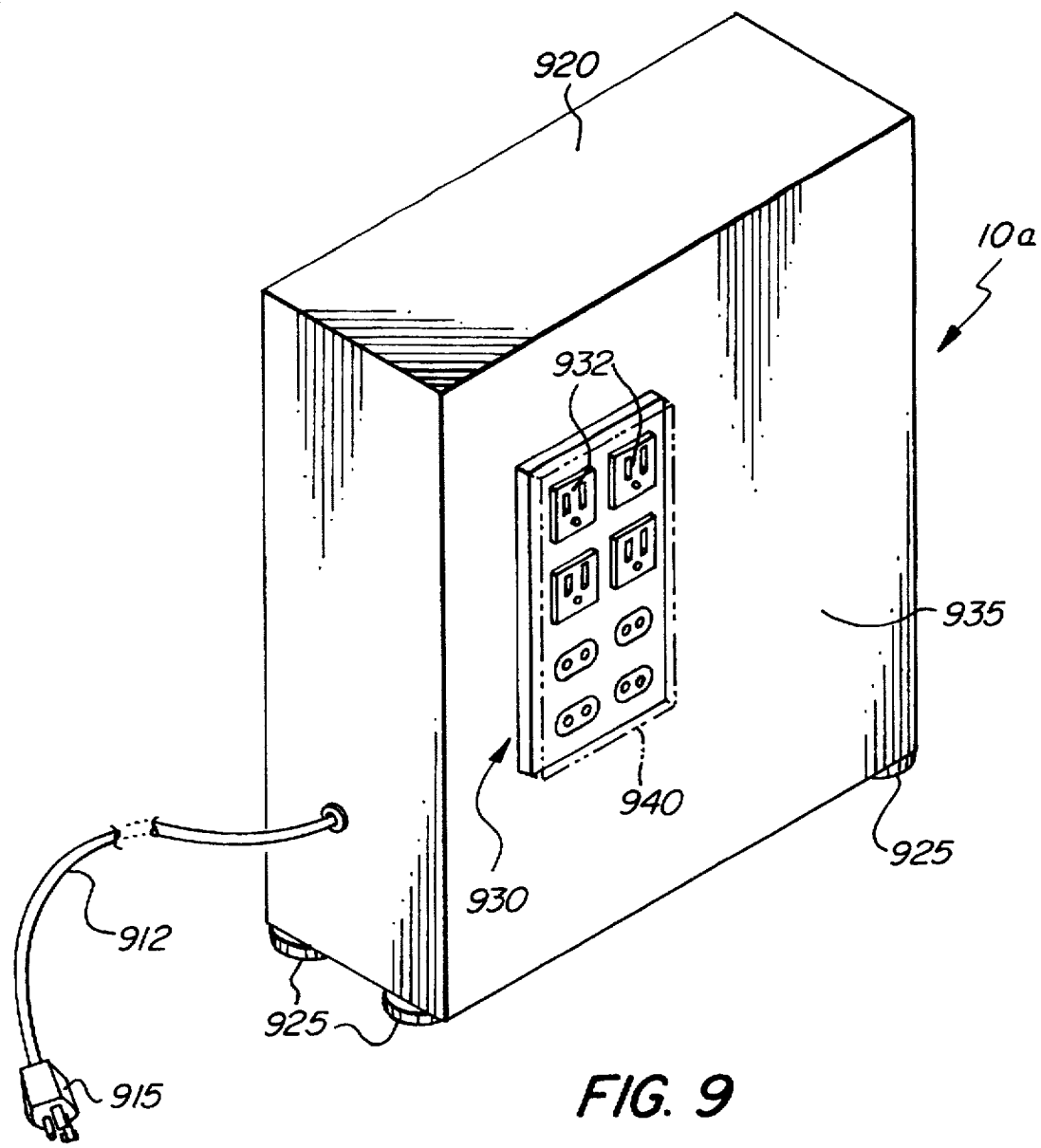
FIG. 9 is a perspective view of a second embodiment of the low voltage power supply and distribution center of FIG. 1.

The low voltage power supply and distribution center of the invention is descried herein as being installed in or on a wall or ceiling for providing low voltage power to lighting loads. However, it will be understood in the art that the present invention may be utilized as a free standing unit. Additionally, the low voltage power may be utilized with any type of low voltage load, such as medical instruments, computer equipment, sensors, test and measurement instrumentation, etc. Referring to FIG. 9, the low voltage power supply and distribution center 10a may be provided as a free standing unit wherein the high voltage supply is provided by a power cord 912 having a standard plug 915 which may be plugged into an available wall outlet (not shown). The housing 920 may be provided with feet 925, such as rubber feet, mounted on the back or side thereof. On the secondary side, a plurality of pairs of low voltage output jacks 930 may be provided for powering various low voltage devices, including low voltage plug-in lighting devices or any other low voltage plug-in device as described above. The low voltage output jacks 930 may be provided in any suitable configuration, such as standard grounded outlets 932, for interconnection to the low voltage loads. Alternative configurations of the low voltage output jacks 930 may be provided, depending upon the plug configuration of the low voltage loads. Additionally, the low voltage output jacks are provided in pairs to complete both sides of a low voltage (12/24 volt) circuit. The pairs of jacks 930 may be mounted on the face of the housing door 935, as shown, for easy access. An optional cover 940 (shown in phantom) may be provided over the low voltage jacks. Alternatively, the jacks may be mounted on or in the housing, as desired.

Although the invention has been described and illustrated with respect to exemplary embodiments thereof, the foregoing and various other additions and omission may be made therein and thereto without departing from the spirit and scope of the invention.

What is claimed is:

1. A low voltage power supply and distribution center connected between a high voltage supply line and at least one low voltage distribution line, said at least one low voltage distribution line being electrically connected to at least one low voltage load which is located remotely from said low voltage power supply and distribution center, said low voltage power supply and distribution center comprising:

a housing defining a housing compartment therein; and
   a housing door pivotally mounted to said housing for movement between a closed operating position and an open service position, said housing door having a circuit component mounting surface supporting a plurality of circuit components, including a transformer having at least one output connected to said at least one low voltage distribution line.

2. A low voltage power supply and distribution center according to claim 1, wherein said housing door is repositionable between an open position and a closed positions, said circuit components being accessible on said circuit component mounting surface in said open position, said circuit components and said circuit component mounting surface being located in said housing compartment in said closed position.

3. A low voltage power supply and distribution center according to claim 2, further comprising circuit access means formed in said housing door, said circuit access means providing access to certain circuit components mounted on said circuit component mounting surface when said housing door is in said closed position.

4. A low voltage power supply and distribution center according to claim 2, further comprising at least one toroidal transformer mounted on a side of said housing door such that when said housing door is in said closed position, said transformer is not within said housing compartment.

5. A low voltage power supply and distribution center according to claim 1, wherein said housing door is manufactured of a material that efficiently dissipates heat through radiation such that said housing door acts as a heat sink for said circuit components mounted thereon.

6. A low voltage power supply and distribution center according to claim 5, wherein said housing door provides sufficient heat dissipation such that when said housing is surrounded with 20 centimeters (8 inches) of insulation, a maximum surface temperature of said housing and housing door is less than 90° C.

7. A low voltage power supply and distribution center according to claim 5, further comprising a cover over said housing door, and wherein said housing door provides sufficient heat dissipation such that when said housing is surrounded with 20 centimeters (8 inches) of insulation, a maximum surface temperature of said housing and cover is less than 90° C.

8. A low voltage power supply and distribution center according to claim 5, wherein said material is aluminum.

9. A low voltage power supply and distribution center according to claim 1, further comprising:
 vent means formed in said housing door for heat dissipation; and
 adjustable damper means held in movable relation to said vent means for opening and closing said vent means.

10. A low voltage power supply and distribution center according to claim 1, wherein said housing door is removably mounted to said housing by a multi-directional, detachable hinge means, said hinge means providing for sliding movement and pivotal movement of said housing door with respect to said housing, said housing door being removably attached to said hinge means for disconnecting said housing door from said housing.

11. A low voltage power supply and distribution center according to claim 10, further comprising means for limiting the pivotal movement of said housing door with respect to said housing.

12. A low voltage power supply and distribution center according to claim 11, wherein said means for limiting includes a strap removably mounted on one end to said housing and removably mounted on another end to said housing door.

13. A low voltage power supply and distribution center according to claim 1, wherein said transformer is a toroidal transformer mounted on said circuit component mounting surface.

14. A low voltage power supply and distribution center according to claim 1, further comprising high voltage compartment means formed on said housing door for housing high voltage circuit components connected to the high voltage supply line and mounted on said housing door.

15. A low voltage power supply and distribution center according to claim 1, wherein said transformer has a plurality of taps from a primary winding thereof, each tap providing a respective low voltage output selected to compensate for voltage loss associated with a respective low voltage load.

16. A low voltage power supply and distribution center according to claim 15, wherein said switch means is a dimmer.

17. A low voltage power supply and distribution center according to claim 1, further comprising emergency lighting circuit means for providing emergency power to said circuit components.

18. A low voltage power supply and distribution center according to claim 17, wherein said emergency lighting circuit means includes:
 emergency power supply means;
 detection means responsive to the absence of power available on the high voltage supply line for providing a switching signal; and
 switching means, responsive to said switching signal, for switching from the high voltage supply line to said emergency power supply means.

19. A low voltage power supply and distribution center according to claim 18, wherein said emergency lighting circuit means is mounted on said housing door.

20. A low voltage power supply and distribution center according to claim 18, wherein said emergency lighting circuit means is located remotely from said housing.

21. A low voltage power supply and distribution center according to claim 1, further comprising a power cord having a plug for connection to an outlet, said outlet being connected to the high voltage supply line.

22. A low voltage power supply and distribution center according to claim 1, further comprising low voltage outlet means for plug in connection of a low voltage distribution line.

23. A low voltage power supply and distribution center according to claim 22, wherein said low voltage outlet means is mounted on said housing door.

24. A low voltage power supply and distribution center according to claim 22, wherein said low voltage outlet means is mounted in or on said housing.

25. A low voltage power supply and distribution center according to claim 1, further comprising a plurality of transformer means mounted on said power door, each transformer means being associated with a respective low voltage distribution line having a respective low voltage circuit attached thereto.

26. A low voltage power supply and distribution center according to claim 25, further comprising dimmer module means for separately and independently dimming each respective low voltage circuit.

27. A low voltage power supply and distribution center connected between a high voltage supply line and at least one low voltage distribution line, said at least one low voltage distribution line being electrically connected to at least one low voltage load which is located remotely from said low voltage power supply and distribution center, said low voltage power supply and distribution center comprising:
 a housing defining a housing compartment therein; and
 a housing door pivotally mounted to said housing for movement between a closed operating position and an open service position, and having circuit components including a transformer mounted thereon and in heat conducting contact therewith, said housing door being manufactured of a material that efficiently dissipates heat through radiation such that said housing door acts as a heat sink for said circuit components mounted thereon.

28. A low voltage power supply and distribution center according to claim 27, wherein said housing door provides sufficient heat dissipation such that when said housing is surrounded with 20 centimeters (8 inches) of insulation, a maximum surface temperature of said housing and housing door is less than 90° C.

29. A low voltage power supply and distribution center according to claim 27, further comprising a cover over said housing door, and wherein said housing door provides sufficient heat dissipation such that when said housing is surrounded with 20 centimeters (8 inches) of insulation, a maximum surface temperature of said housing and cover door is less than 90° C.

30. A low voltage power supply and distribution center according to claim 27, further comprising at least one circuit component mounting surface on said housing door for mounting circuit components.

31. A low voltage power supply and distribution center according to claim 30, wherein said housing door is repositionable between an open position and a closed position, said circuit components being accessible on said circuit component mounting surface in said open position, said circuit components and said circuit component mounting surface being located in said housing compartment in said closed position.

32. A low voltage power supply and distribution center according to claim 31, further comprising circuit access means formed in said housing door, said circuit access means providing access to certain circuit components mounted on said circuit component mounting surface when said housing door is in said closed position.

33. A low voltage power supply and distribution center according to claim 31, further comprising at least one toroidal transformer mounted on a side of said housing door such that when said housing door is in said closed position, said transformer is not within said housing compartment.

34. A low voltage power supply and distribution center according to claim 30, wherein said circuit components includes at least one toroidal transformer mounted on said circuit component mounting surface.

35. A low voltage power supply and distribution center according to claim 27, wherein said material is aluminum.

36. A low voltage power supply and distribution center according to claim 27, further comprising:
vent means formed in said housing door for additional heat dissipation; and
adjustable damper means held in movable relation to said vent means for opening and closing said vent means.

37. A low voltage power supply and distribution center according to claim 27, wherein said housing door is removably mounted to said housing by a multi-directional, detachable hinge means, said hinge means providing for sliding movement and pivotal movement of said housing door with respect to said housing, said housing door being removably attached to said hinge means for disconnecting said housing door from said housing.

38. A low voltage power supply and distribution center according to claim 37, further comprising means for limiting the pivotal movement of said housing door with respect to said housing.

39. A low voltage power supply and distribution center according to claim 38, wherein said means for limiting includes a strap removably mounted on one end to said housing and removably mounted on another end to said housing door.

40. A low voltage power supply and distribution center according to claim 27, further comprising emergency lighting circuit means for providing emergency power to said circuit components.

41. A low voltage power supply and distribution center according to claim 40, wherein said emergency lighting circuit means includes:
emergency power supply means;
detection means responsive to the absence of power available on the high voltage supply line for providing a switching signal; and
switching means, responsive to said switching signal, for switching from the high voltage supply line to said emergency power supply means.

42. A low voltage power supply and distribution center according to claim 41, wherein said emergency lighting circuit means is mounted on said housing door.

43. A low voltage power supply and distribution center according to claim 41, wherein said emergency lighting circuit means is located remotely from said housing.

44. A low voltage power supply and distribution center according to claim 27, further comprising a power cord having a plug for connection to an outlet, said outlet being connected to the high voltage supply line.

45. A low voltage power supply and distribution center according to claim 27, further comprising low voltage outlet means for plug in connection of a low voltage distribution line.

46. A low voltage power supply and distribution center according to claim 45, wherein said low voltage outlet means is mounted on said housing door.

47. A low voltage power supply and distribution center according to claim 45, wherein said low voltage outlet means is mounted in or on said housing.

48. A low voltage power supply and distribution center according to claim 27, further comprising a plurality of transformer means mounted on said power door, each transformer means being associated with a respective low voltage distribution line having a respective low voltage circuit attached thereto.

49. A low voltage power supply and distribution center according to claim 48, further comprising dimmer module means for separately and independently dimming each respective low voltage circuit.

50. A low voltage power supply and distribution center connected between a high voltage supply line and at least one low voltage distribution line, said at least one low voltage distribution line being electrically connected to at least one low voltage load which is located remotely from said low voltage power supply and distribution center, said low voltage power supply and distribution center comprising:
a housing defining a housing compartment therein; and
a housing door pivotally mounted to said housing for movement between a closed operating position and an open service position, and supporting a plurality of circuit components, including a transformer, mounted thereon, said housing door being manufactured of a material that efficiently dissipates heat through radiation such that said housing door acts as a heat sink for said circuit components mounted thereon; and
low voltage outlet means, coupled to an output of said transformer, for plug in connection of the low voltage distribution line.

51. A low voltage power supply and distribution center according to claim 50, further comprising a power cord having a plug for connection to an outlet, said outlet being connected to the high voltage supply line.

52. A low voltage power supply and distribution center according to claim 50, wherein said low voltage outlet means is mounted on said housing door.

53. A low voltage power supply and distribution center according to claim 50, wherein said low voltage outlet means is mounted in or on said housing.

* * * * *